United States Patent
Muff et al.

(10) Patent No.: US 9,021,004 B2
(45) Date of Patent: *Apr. 28, 2015

(54) EXECUTION UNIT WITH INLINE PSEUDORANDOM NUMBER GENERATOR

(75) Inventors: Adam James Muff, Rochester, MN (US); Matthew Ray Tubbs, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 344 days.

This patent is subject to a terminal disclaimer.

(21) Appl. No.: 13/556,464

(22) Filed: Jul. 24, 2012

(65) Prior Publication Data

US 2012/0303691 A1 Nov. 29, 2012

Related U.S. Application Data

(63) Continuation of application No. 12/132,115, filed on Jun. 3, 2008, now Pat. No. 8,255,443.

(51) Int. Cl.
G06F 7/48 (2006.01)
G06F 9/38 (2006.01)
G06F 9/30 (2006.01)

(52) U.S. Cl.
CPC .......... *G06F 9/3851* (2013.01); *G06F 9/30181* (2013.01); *G06F 9/30014* (2013.01)

(58) Field of Classification Search
None
See application file for complete search history.

(56) References Cited

U.S. PATENT DOCUMENTS

| 7,139,785 | B2* | 11/2006 | Crispin | 708/250 |
|---|---|---|---|---|
| 7,174,355 | B2* | 2/2007 | Henry et al. | 708/250 |
| 7,219,112 | B2 | 5/2007 | Henry et al. | |
| 7,334,009 | B2 | 2/2008 | Henry et al. | |
| 7,849,120 | B2 | 12/2010 | Henry et al. | |
| 8,255,443 | B2* | 8/2012 | Muff et al. | 708/252 |
| 2004/0064491 | A1 | 4/2004 | Rarick | |
| 2004/0143614 | A1 | 7/2004 | Rarick | |
| 2009/0300335 | A1* | 12/2009 | Muff et al. | 712/221 |
| 2012/0303691 | A1* | 11/2012 | Muff et al. | 708/252 |

OTHER PUBLICATIONS

"Perlin Noise," http://freespace.virgin.net/hugo.elias/models/m_perlin.htm (downloaded on May 14, 2008).
U.S. Patent and Trademark Office, Office Action issued in related U.S. Appl. No. 12/132,115, dated Jan. 4, 2012.
U.S. Patent and Trademark Office, Notice of Allowance issued in related U.S. Appl. No. 12/132,115, dated Apr. 19, 2012.

* cited by examiner

*Primary Examiner* — David H Malzahn
(74) *Attorney, Agent, or Firm* — Wood, Herron & Evans, LLP

(57) ABSTRACT

A circuit arrangement and method couple a hardware-based pseudorandom number generator (PRNG) to an execution unit in such a manner that pseudorandom numbers generated by the PRNG may be selectively output to the execution unit for use as an operand during the execution of instructions by the execution unit. A PRNG may be coupled to an input of an operand multiplexer that outputs to an operand input of an execution unit so that operands provided by instructions supplied to the execution unit are selectively overridden with pseudorandom numbers generated by the PRNG. Furthermore, overridden operands provided by instructions supplied to the execution unit may be used as seed values for the PRNG.

23 Claims, 8 Drawing Sheets

EXECUTION UNIT WITH INLINE PSEUDORANDOM NUMBER GENERATOR

CROSS-REFERENCE TO RELATED APPLICATIONS

This application is a continuation of U.S. patent application Ser. No. 12/132,115, filed on Jun. 3, 2008 by Adam James Muff et al. (now issued as U.S. Pat. No. 8,255,443), the entire disclosure of which is incorporated by reference herein.

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multi-threading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A SIMD or vector execution unit typically includes multiple processing lanes that handle different datapoints in a vector and perform similar operations on all of the datapoints at the same time. For example, for an architecture that relies on quad(4)word vectors, an SIMD or vector execution unit may include four processing lanes that perform the identical operations on the four words in each vector.

The aforementioned techniques may also be combined, resulting in a multi-threaded vector execution unit architecture that enables multiple threads to issue SIMD instructions to an SIMD execution unit to process "vectors" of data points at the same time. Typically, a scheduling algorithm is utilized in connection with issue logic to ensure that each thread is able to proceed at a reasonable rate, with the number of bubbles in the execution unit pipeline kept at a minimum.

It has been found, however, that while this configuration is highly desirable for a significant amount of code, there are certain algorithms that are inefficient to execute in a conventional execution unit. For example, oftentimes in computer graphics applications such as 3D videogames, there is a need for computer-generated textures (also referred to as "procedural textures") rather than bitmapped textures. Procedural textures have a number of advantages over bitmapped textures. They use much less memory and memory bandwidth, they generally don't require computationally intensive texture filtering, and in some circumstances they can look significantly more realistic. However, to get a satisfactory amount of realism from a procedural texture, there must be a good amount of "randomness" to emulate many visuals found in the natural world. The need for such randomness has traditionally been a major drawback to using procedural textures due to the fact that producing good random numbers in conventional hardware is typically a very computationally intensive operation.

Oftentimes, pseudorandom number generator functions are used to deterministically generate numbers suitable for use as random numbers. A pseudorandom function typically outputs the same value for any given input value, but the function itself generates numbers that appear to be random in nature. As an example, Table I below shows example pseudocode for a pseudorandom number generator function call for use in a Perlin noise procedural texture application:

TABLE I

Perlin Noise Function

```
float noise1(int32 in)
{
    int32 x = (in << 12) ^ in;
    int32 tmp = (x * (CONST_INT_PRIME1 * x * x +
        CONST_INT_PRIME2) + CONST_INT_LARGE1);
    tmp &= 0x7FFFFFFF;
    float returnf = (1.0 – tmp) / CONST_FLOAT_LARGE;
    return returnf;
}
```

With conventional execution units, it would take at least 9 full passes through an arithmetic pipeline to perform this function each time it is called (which would usually be multiple times per pixel), with many of those passes dependent on a previous pass, making this a very slow function. Table II below, for example, shows example pseudo assembly language for implementing the aforementioned Perlin noise function:

TABLE II

Perlin Noise Function Assembly Code

```
noise1:          #arguments in register rin
  slwi    rin, rin, 12      # shift contents of GPR rin left by 12 bits
  mv      tmp, rin          # copy contents of rin to tmp
  mv      rslt, rin         # copy contents of rin to rslt
  subi    tmp, tmp, 1       # tmp = tmp − 1
  ble     done              # skip loop if count is less than or equal to 0
loop:                       # this loop implements the exponentiation rin^rin
  mul     rslt, rslt, rin   # multiply temporary result with rin
  subi.   tmp, tmp, 1       # subtract count by 1
  bgt     loop              # if count is greater than 0, branch to loop
done:
  mul     tmp1, rslt, rslt          # square rslt
  mul     tmp1, tmp1, prime1        # tmp1 = rslt^2 * prime1
  add     tmp1, tmp1, prime2        # tmp1 = rslt^2 * prime1 + prime2
  mul     tmp1, tmp1, rslt          # tmp1 = rslt*(rslt^2 * prime1 + prime2)
  add     tmp1, tmp1, const1        # tmp1 = rslt*(rslt^2 * prime1 + prime2)+const
  fconvfint fin, tmp1                 # convert GPR value to float in fin
  fabs    fin, fin                  # fin = absolute value of fin
  fsub    fin, fone, fin            # fin = 1.0 − fin
  fmul    frslt, fin, fconst2       # frslt = fin * small_normalizing_constant
  blr                               # branch to link register
                                    # (return from subroutine, result in frslt)
```

In addition, oftentimes the pseudorandom number result is passed into another function, such as a multiply or trigonometric function, which takes additional cycles, since the dependent instruction must be stalled until the pseudorandom function completes. For instance, in some Perlin noise generation algorithms, the pseudorandom number from the 1$^{st}$ noise function call is passed into a smoothing function, and then interpolated. A smoothing function, however, may involve the noise function result or a sum of several noise function results with a power of two.

As an example, Table III below shows example pseudocode for a one dimensional smoothing function call for use in a Perlin noise procedural texture application, while Table IV shows example pseudocode for a two dimensional smoothing function call for use in a Perlin noise procedural texture application:

TABLE III

One Dimensional Smoothing Function

```
float smthNoise1(int32 x)
{
  return (0.25 * noise1(x−1)) + (0.5 * noise1(x)) + (0.25 * noise1(x+1));
}
```

TABLE IV

Two Dimensional Smoothing Function

```
function SmoothNoise_2D(x, y)
  corners = ( Noise(x−1, y−1)+Noise(x+1, y−1)+Noise(x−1, y+1)+
      Noise(x+1, y+1) ) / 16
  sides = ( Noise(x−1, y) +Noise(x+1, y) +Noise(x, y−1) +
      Noise(x, y+1) ) / 8
  center = Noise(x, y) / 4
  return corners + sides + center
end function
```

Table V below shows example pseudo assembly language for implementing the aforementioned one dimensional smoothing function. For simplicity, however, assembly language for the aforementioned two dimensional smoothing function is not provided herein:

TABLE V

One Dimensional Smoothing Function Assembly Code

```
smoothnoise1:                               # input to function is in the GPR rin
  mv      rin_tmp, rin        # copy rin to rin_tmp
  bl      noise1              # call the noise1 function (result in frslt)
  fmul    frslt_tmp, frslt, fhalf    # frslt_tmp = frslt * 0.5
  sub     rin, rin_tmp, one   # tmp = original_rin − 1
  bl      noise1              # call the noise1 function (result in frslt)
  fmadd   frslt_tmp, frslt, ffourth, frslt_tmp    # frslt_tmp +=
                                                  (frslt * 0.25)
  add     rin, rin_tmp, one   # tmp = original_rin + 1
  bl      noise1              # call the noise1 function (result in frslt)
  fmadd   frslt_tmp, frslt, ffourth, frslt_tmp    # frslt_tmp +=
                                                  (frslt * 0.25)
                              # final result in frslt_tmp
```

Even in a highly optimistic scenario with a seed value of 3, the aforementioned one dimensional smooth function above would need approximately 50 dependent pipeline passes to complete.

Pseudorandom number generation has other uses beyond generating noise for use in procedural texture generation. For example, pseudorandom number generation is used in cryptography, as well as in simulations. However, in many conventional execution units, the generation of pseudorandom numbers adversely impacts performance due to the highly dependent nature of known algorithms.

Therefore, a need exists in the art for a manner of improving the performance of an execution unit in generating pseudorandom numbers for use in arithmetic operations.

SUMMARY OF THE INVENTION

The invention addresses these and other problems associated with the prior art by coupling a hardware-based pseudorandom number generator (PRNG) to an execution unit in such a manner that pseudorandom numbers generated by the PRNG may be selectively output to the execution unit for use as an operand during the execution of instructions by the execution unit. In some embodiments, for example, a PRNG is coupled to an input of an operand multiplexer that outputs to an operand input of an execution unit so that operands provided by instructions supplied to the execution unit are selectively overridden with pseudorandom numbers generated by the PRNG. Furthermore, in some embodiments, overridden operands provided by instructions supplied to the execution unit are used as seed values for the PRNG. In many embodiments, the aforementioned configuration enables an instruction executed by an execution unit to perform an arithmetic operation using both an operand specified by the instruction and a pseudorandom number generated by the PRNG during the execution of the instruction, so that the generation of the pseudorandom number and the performance of the arithmetic operation occur during a single pass of the execution unit.

Consistent with one aspect of the invention, a circuit arrangement includes a PRNG configured to generate a pseudorandom number, an execution unit configured to execute instructions from an instruction set, and control logic coupled to the execution unit. The execution unit is configured to execute a first instruction from the instruction set using a plurality of operands, and the control logic is configured to supply the plurality of operands to the execution unit during execution of the first instruction. The control logic is further configured to selectively output to the execution unit a pseudorandom number generated by the PRNG for use as a first operand among the plurality of operands during execution of the first instruction by the execution unit.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize an inline pseudorandom number generator (PRNG) in an execution unit to enable pseudorandom numbers generated by the PRNG to be selectively output to the execution unit for use as an operand during the execution of instructions by the execution unit. In many embodiments, providing pseudorandom numbers as operands for an execution unit in the manner described herein avoids dependent instruction stalls and long latency pseudorandom functions typically associated with the generation and use of pseudorandom numbers in conventional execution units.

Hardware and Software Environment

Figure 1:
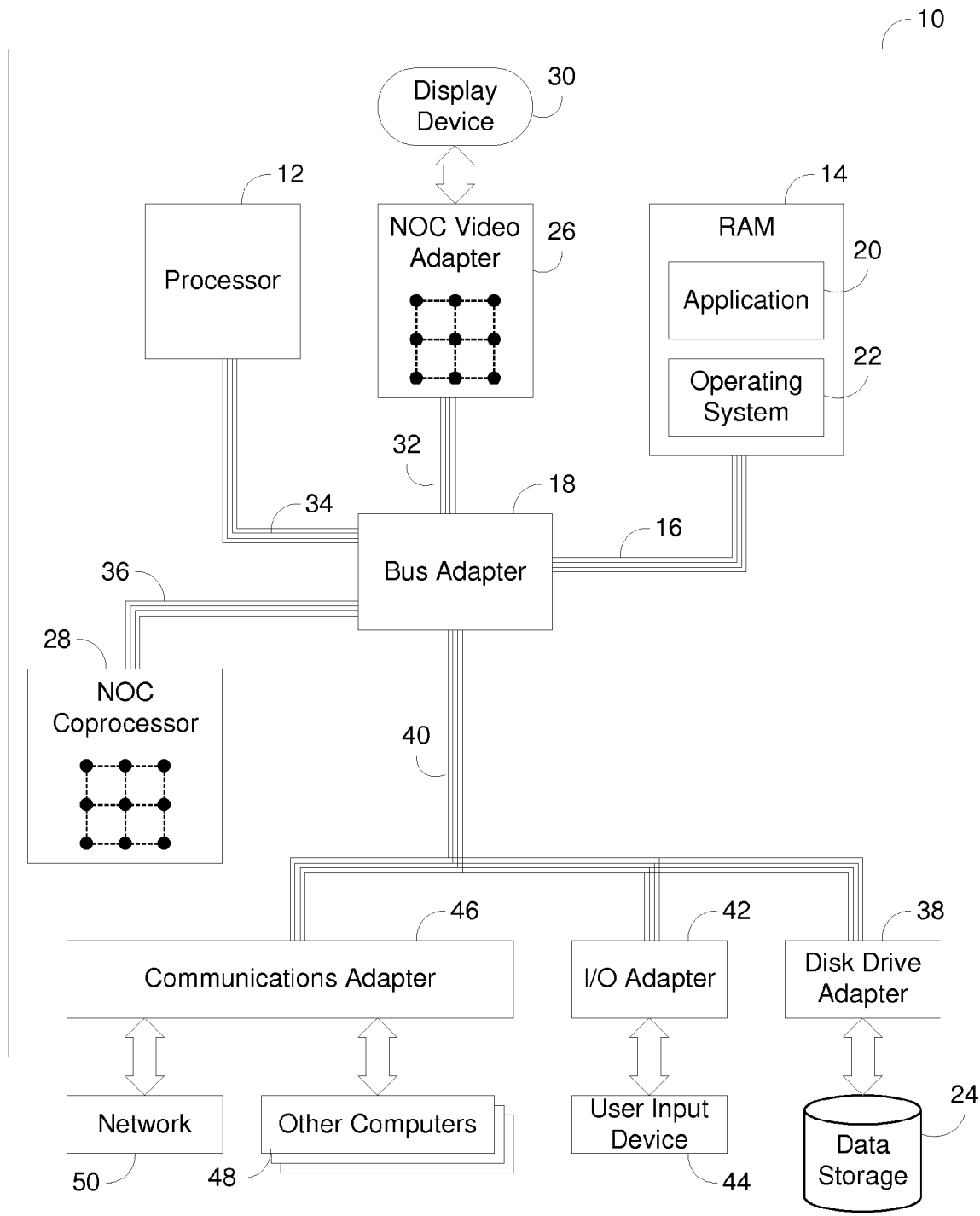
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
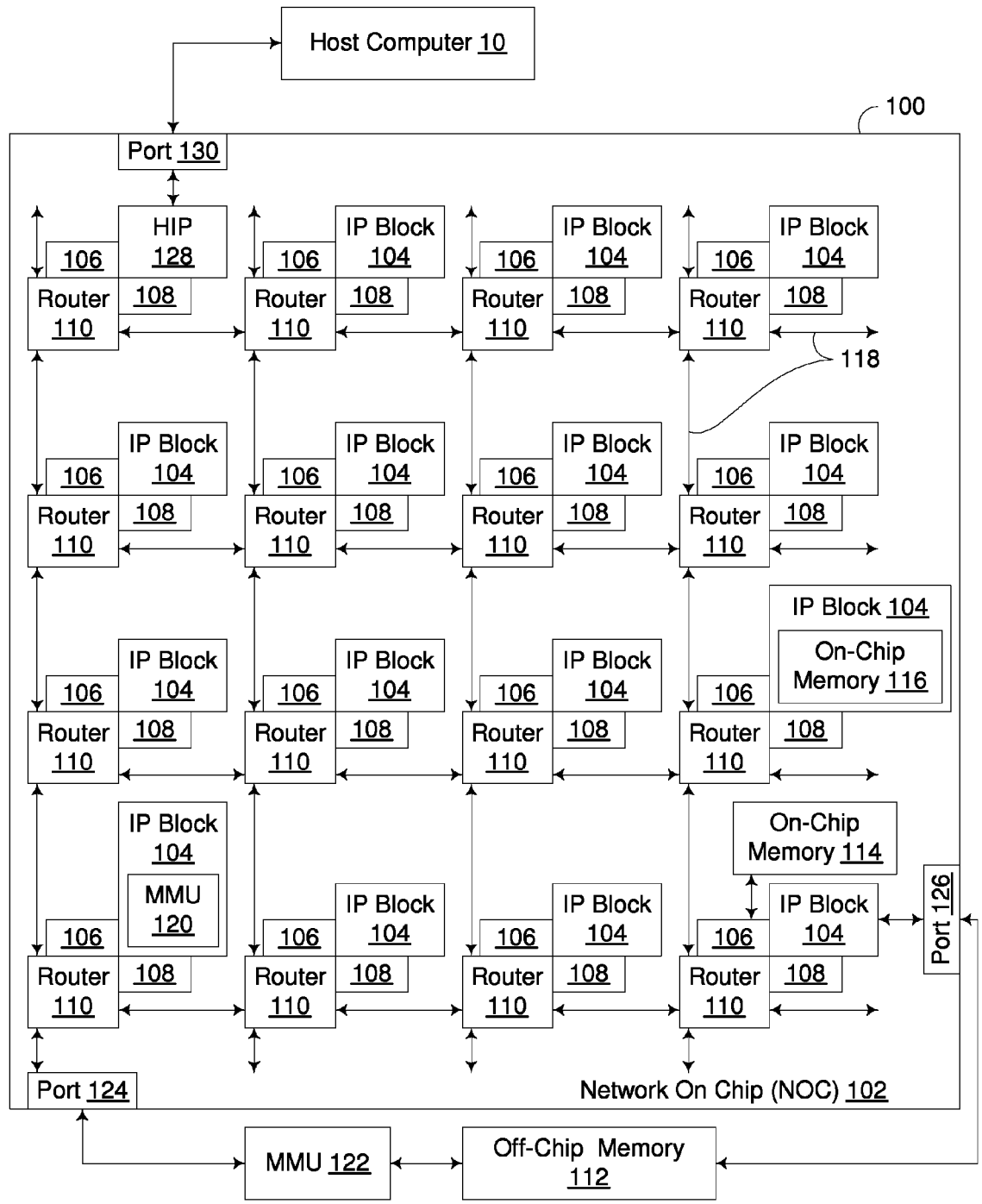
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
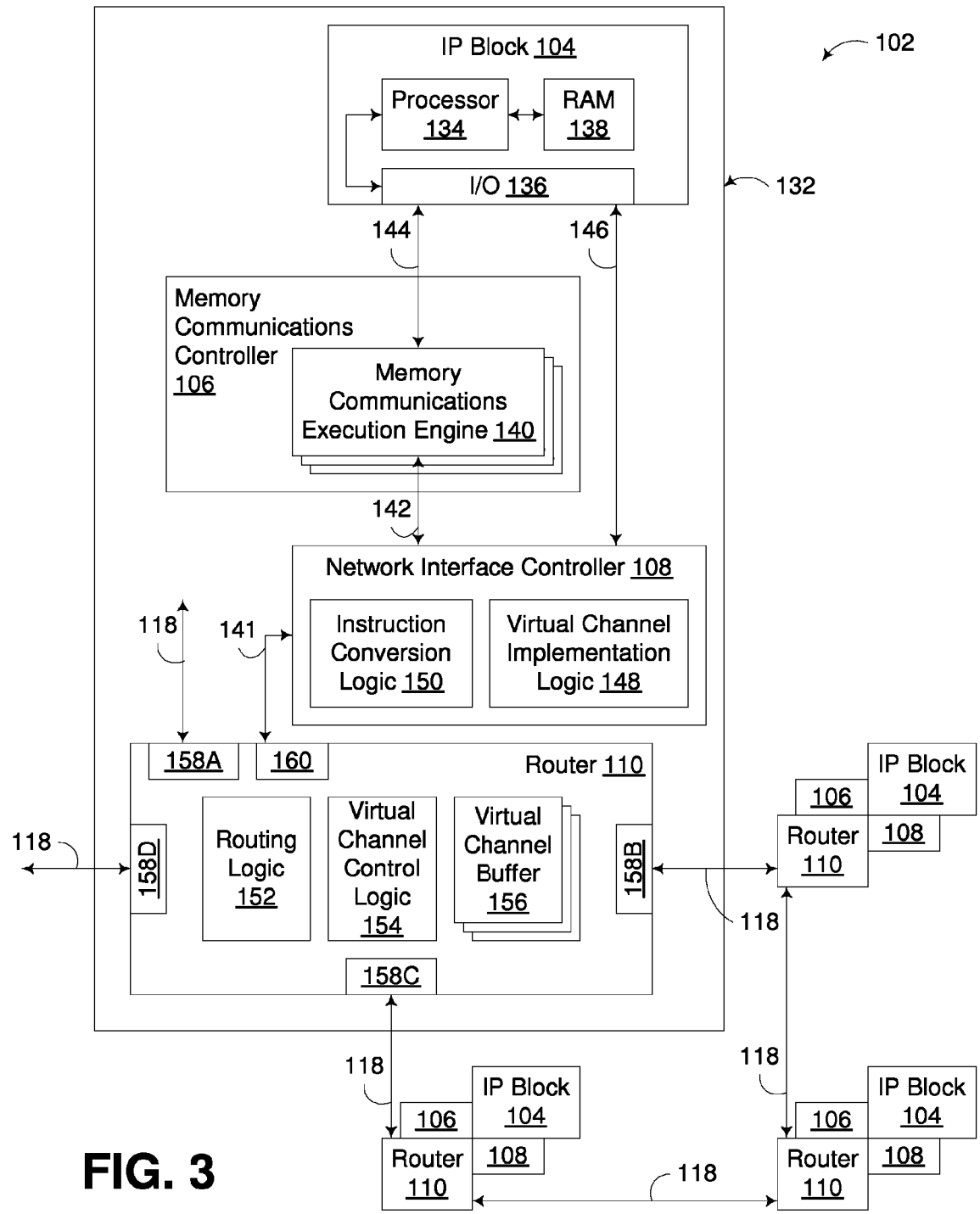
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
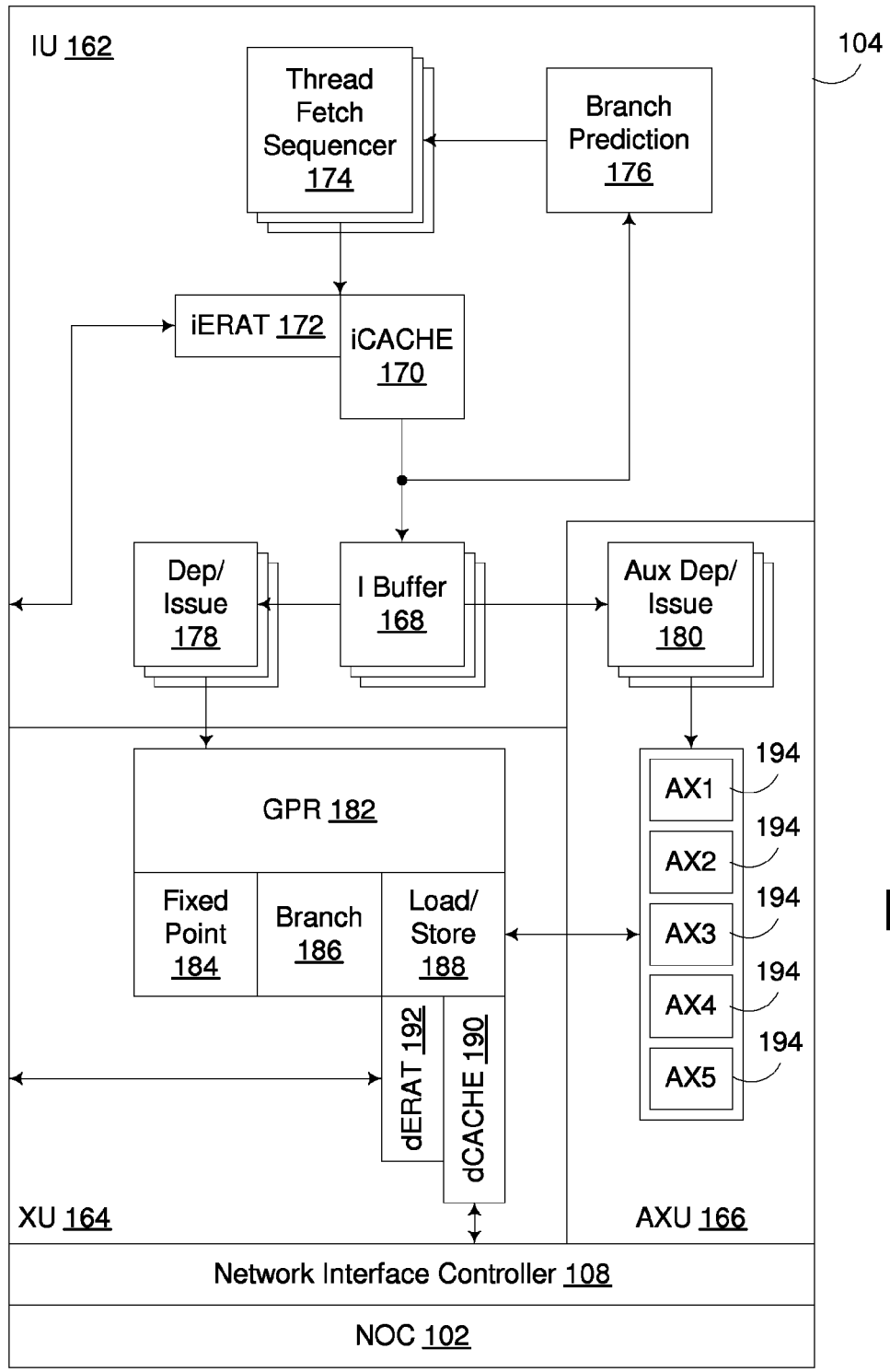
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Execution Unit with Inline Pseudorandom Number Generator

Figure 5:
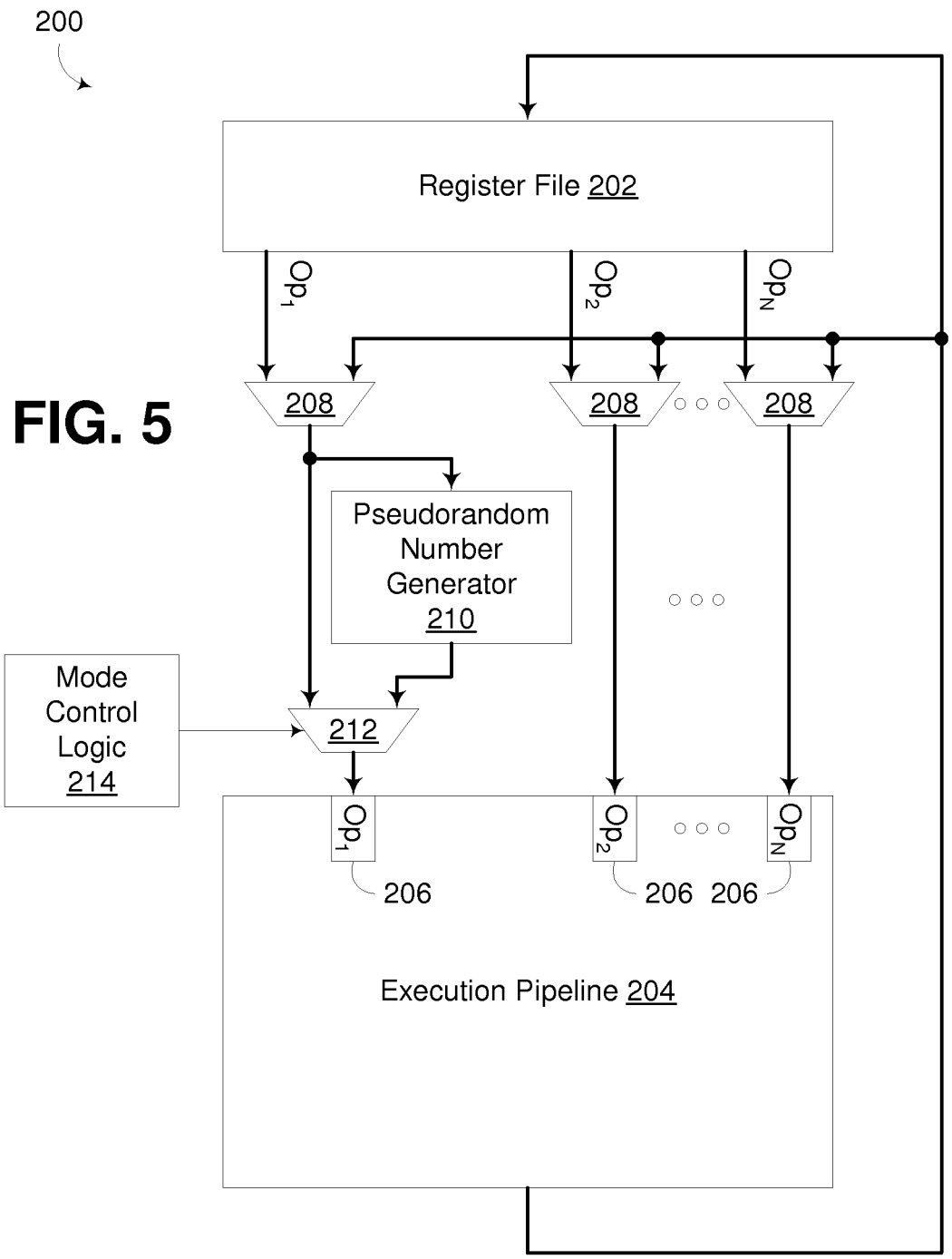
FIG. 5 is a block diagram of an exemplary implementation of an execution unit incorporating an inline pseudorandom number generator consistent with the invention.

Now turning to FIG. 5, this figure illustrates an exemplary execution unit 200 incorporating a register file 202 coupled to an execution pipeline 204. Execution pipeline 204 is configured to execute instructions from an instruction set, where at least one of the instructions from that instruction set uses a plurality of operands to perform an operation (e.g., a fixed point or floating point arithmetic operation) using those operands. Execution pipeline 204 includes one or more operand inputs 206, representing pathways through which input data is supplied to the pipeline for use during execution of an instruction. One or more operands, denoted as Op1 to OpN, are typically supplied by register file 202, although in some instances, the operands for a particular instruction may be provided directly by a later stage of the pipeline as a result of a prior instruction. A set of bypass multiplexers 208, for example, may be used to selectively route result data back to the execution pipeline and bypass the register file 202 in instances where the result of one instruction is used as input to a subsequent instruction. In some instructions, operands may also be immediate operands, and thus may not be based upon the contents of a register in register file 202. Suitable logic (not shown) may be provided to route immediate data to execution pipeline 204 for use during the execution of instructions. Various instructions within the instruction set supported by execution unit 200 may utilize zero, one, or multiple operands, and as such, not all operand inputs 206 may be used during the execution of certain instructions. Furthermore, as noted above multiple operand sources (e.g., register file 202, immediate data, result data, etc.) may provide operands to operand inputs 206 for different instructions in the instruction set.

In the illustrated embodiment, execution unit 200 also includes an inline pseudorandom number generator (PRNG) 210 disposed between register file 202 and execution pipeline 204, and configured to generate a pseudorandom number. PRNG 210 is desirably implemented using logic capable of generating a number within a single pipeline execution cycle. For example, a linear feedback shift register (LFSR), which is a known logic circuit suitable for generating pseudorandom numbers, may be used to implement PRNG 210. Other known logic circuits capable of being used to generate pseudorandom numbers may be used in the alternative.

In the illustrated embodiment, PRNG 210 is coupled within the pathway for one of operands Op1-OpN (e.g., Op1), and control logic, here implemented as an operand multiplexer 212 controlled by mode control logic 214, is used to selectively override an operand output by bypass multiplexer 208 (e.g., an operand from register file 202 or an operand generated as a result of a previous instruction) with a pseudorandom number generated by PRNG 210 to provide the pseudorandom number as an operand to the pipeline at an operand input 206. Furthermore, in the illustrated embodiment, PRNG 210 receives as an input the overridden operand from bypass multiplexer 208 (e.g., an operand from register file 202) such that that operand is used as a seed value for the PRNG 210. In other embodiments, however, other data sources may be used for the seed value for a PRNG, so the seed value for the PRNG 210 need not be provided by register file 202.

Mode control logic 214 serves to control a select input to operand multiplexer 212, controlling the multiplexer in one mode to output operand Op1 to operand input 206, and in another mode to output a pseudorandom number generated by PRNG 210 to operand input 206. In one implementation, for example, mode control logic 214 may include a software accessible special purpose register (SPR), the bits of which control one or more operand multiplexers 212, such that software executing on execution unit 200 may directly control mode control logic 214. In one embodiment, for example, a dedicated instruction, e.g., a mode control instruction, may be included in the instruction set to enable the SPR to be set to a predetermined value by software, with an operand provided by the instruction specifying a value to store in the SPR.

Other manners of controlling operand multiplexer 212 via software, e.g., using an operand and/or opcode identified in an instruction, may also be used. For example, certain arithmetic instructions may include opcodes or secondary opcodes that specify which, if any operands should be selectively overridden with a pseudorandom number. Alternatively, certain arithmetic operations may require an operand that specifies which, if any operands should be selectively overridden with a pseudorandom number. Other manners of controlling operand multiplexer 212 may be used in the alternative.

As illustrated in FIG. 5, a single PRNG 210 is coupled to the pathway for a single operand Opt, such that the Op1 operand output by register file 202 is passed to one input of the corresponding operand multiplexer 212, with PRNG 210 coupled to the other input of multiplexer 212. The output of multiplexer 212 is coupled to the corresponding operand input 206. All remaining operands Op2-OpN are passed directly to their corresponding operand inputs 206 via the corresponding bypass multiplexer 208, such that only operand Op1 is capable of being selectively overridden with a pseudorandom number. In other embodiments, however, multiple operands may be selectively overridden with pseudorandom numbers.

Figure 6:
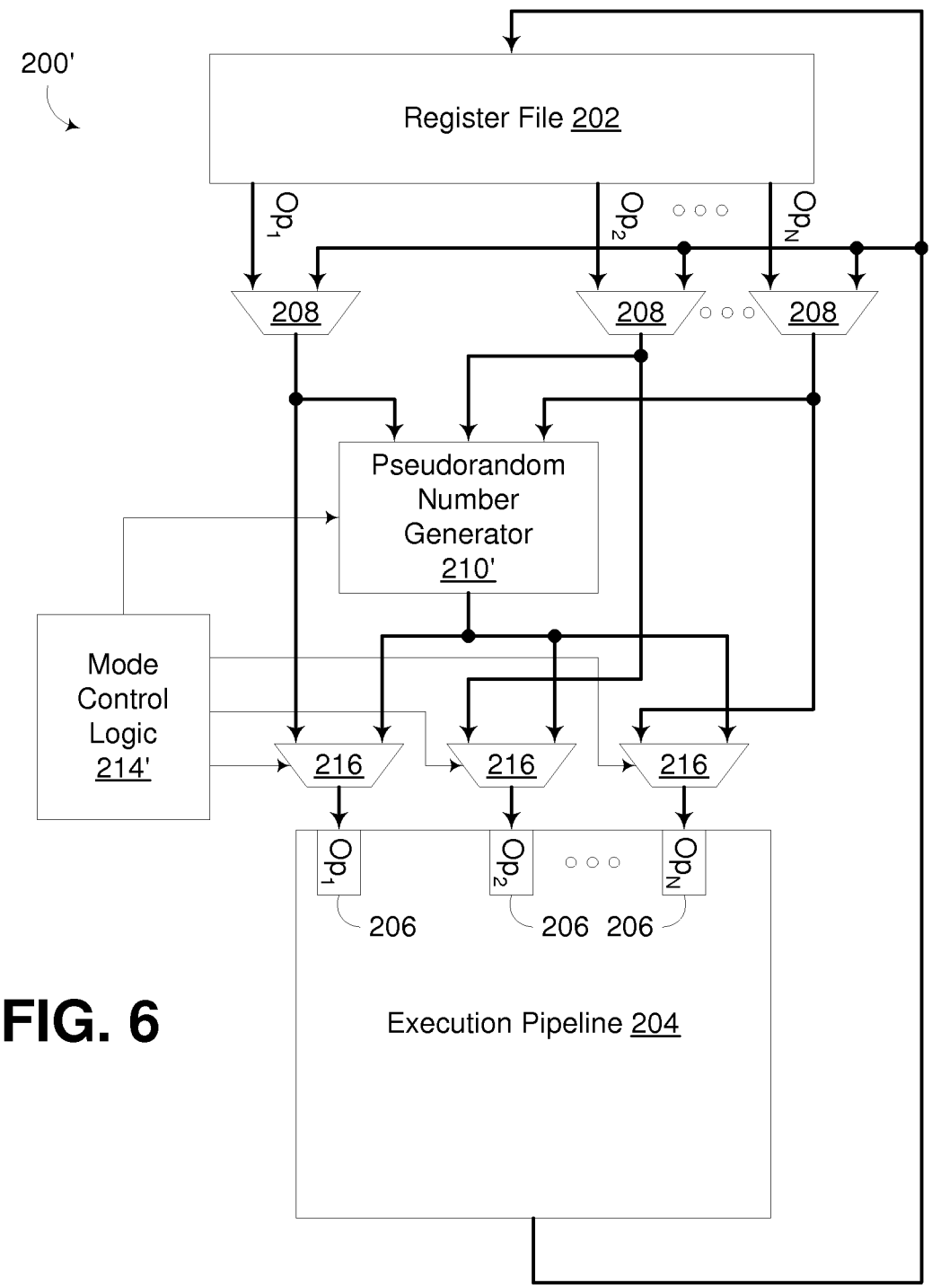
FIG. 6 is a block diagram of an alternate implementation of an execution unit to that of FIG. 5.

For example, as shown in FIG. 6, an execution unit 200' may include a set of operand multiplexers 216 rather than a single operand multiplexer 212 as is shown in FIG. 5, with a common PRNG 210' coupled to inputs of each operand multiplexer 216. PRNG 210' may also receive any of operands Op1-OpN as an input or seed value to the pseudorandom function. Mode control logic 214' is then configured to control each operand multiplexer 216 separately, selectively overriding any of the operands with a pseudorandom number generated by PRNG 210'. Mode control logic 214' may also control which operand is used as a seed value for PRNG 210'.

In another embodiment, which will be discussed in greater detail below in connection with FIG. 8, multiple PRNG's may be used, each dedicated to a particular operand input, such that separate pseudorandom numbers may be generated for each operand input, and if desired, multiple pseudorandom numbers may be used by a single instruction. Other variations will be apparent to one of ordinary skill in the art having the benefit of the instant disclosure.

So configured, a pseudorandom number may be selectively provided along with one or more other operands as inputs to an execution pipeline for processing during the execution of a single instruction. In addition, in the case where the instruction performs an arithmetic operation, the arithmetic operation may use the pseudorandom number in the same pass through the execution pipeline during which the pseudorandom number is generated, thus eliminating the inter-instruction dependency that would otherwise arise if the pseudorandom number was generated by a different instruction than that which used the number in an arithmetic operation.

Figure 7:
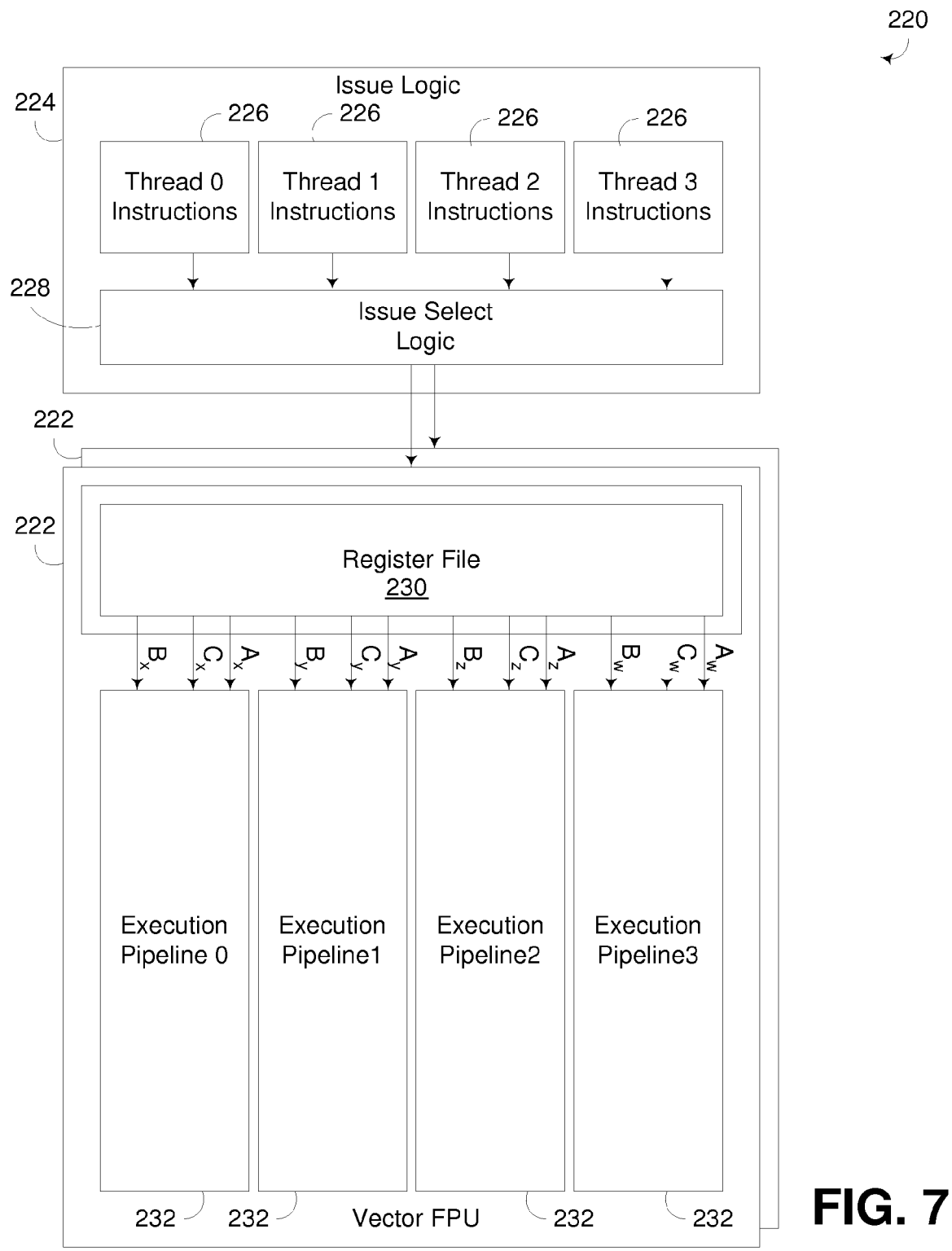
FIG. 7 is a block diagram of an exemplary implementation of a processing unit incorporating an execution unit with inline pseudorandom number generator consistent with the invention, and capable of being implemented within an IP block from the NOC of FIG. 2.

While execution units such as execution units 200 and 200' may be used in a wide variety of alternative circuit arrangements, FIG. 7 illustrates one exemplary processing unit 220 capable of implementing an execution unit with an inlined pseudorandom number generator such as has been described herein. In particular, processing unit 220 incorporates one or more single instruction multiple data (SIMD) or vector execution units 222 including inline pseudorandom number generators consistent with the invention. Processing unit 220 may be implemented, for example, in an IP block such as an IP block 104 from FIGS. 1-4. In the alternative, processing unit 220 may be implemented in other processor architectures that issue and execute instructions, including single or multi-core microprocessors or microcontrollers. In addition, a processing unit incorporating an inlined pseudorandom number generator consistent with the invention may utilize execution units that are scalar or vector, pipelined or not pipelined, single threaded or multithreaded, or fixed or floating point, among other variations. The invention is therefore not limited to the particular implementation illustrated in FIG. 7.

In processing unit 220, each SIMD execution unit 222 processes instructions issued to the execution unit by issue logic 224, and includes a register file 230 coupled to a plurality of processing lanes or sub-units, also referred to herein as execution pipelines 232 (e.g., four execution pipelines) capable of processing data stored in register file 230 based upon the instructions issued by issue logic 224, and storing target data back to the register file. Each SIMD execution unit 222 may be implemented as a number of different types of execution units, e.g., floating point units, fixed point units, or specialized execution units such as graphics processing units, encryption/decryption units, coprocessors, XML processing units, etc., for which vector-based processing may be required or desirable.

Issue logic 224 in processing unit 220 includes issue select logic 228 that is capable of issuing instructions from a plurality of threads (e.g., four threads), illustrated at 226. Issue select logic 228 operates to schedule the issuance of instructions by the various threads, and typically includes logic for managing dependencies between instructions, in a manner generally understood in the art. When multiple SIMD execution units 222 are supported, issue select logic 228 is capable of issuing multiple instructions to the multiple execution units each cycle. In some embodiments, however, only one execution unit may be supported, and furthermore, in some embodiments multi-threaded issue of instructions may not be supported.

SIMD execution unit 220 is specifically implemented as an SIMD floating point unit, e.g., as used for image processing. Given the configuration of processing unit 220 as a floating point unit usable in image processing applications, each execution pipeline 232 is configured to process floating point instructions. While a wide variety of other floating point architectures may be used in the alternative, processing unit 220 includes a pipelined floating point execution architecture capable of operating on three vector operands, denoted A, B and C. For vector operations, four word vectors are supported, with the words in each vector being denoted as X, Y, Z and W (e.g., where X, Y, Z, and W refer to the coordinates of a vertex), and as such, each execution pipeline 232 receives three operand words, one from each vector. Thus, for example, for the execution pipeline 232 that processes the X word from each vector, the operands fed to that processing lane are denoted as AX, BX and CX.

Each execution pipeline 232 is configured to perform an operation in parallel with one or more other execution pipelines. For example, each execution pipeline may multiply a pair of operands to perform a cross product or dot product operation. By multiplying different pairs of operands in different execution pipelines of the vector unit, vector operations may be performed faster and more efficiently.

Each execution pipeline 232 is also pipelined to further improve performance. Accordingly, each execution pipeline 232 includes a plurality of pipeline stages for performing one or more operations on the operands.

Figure 8:
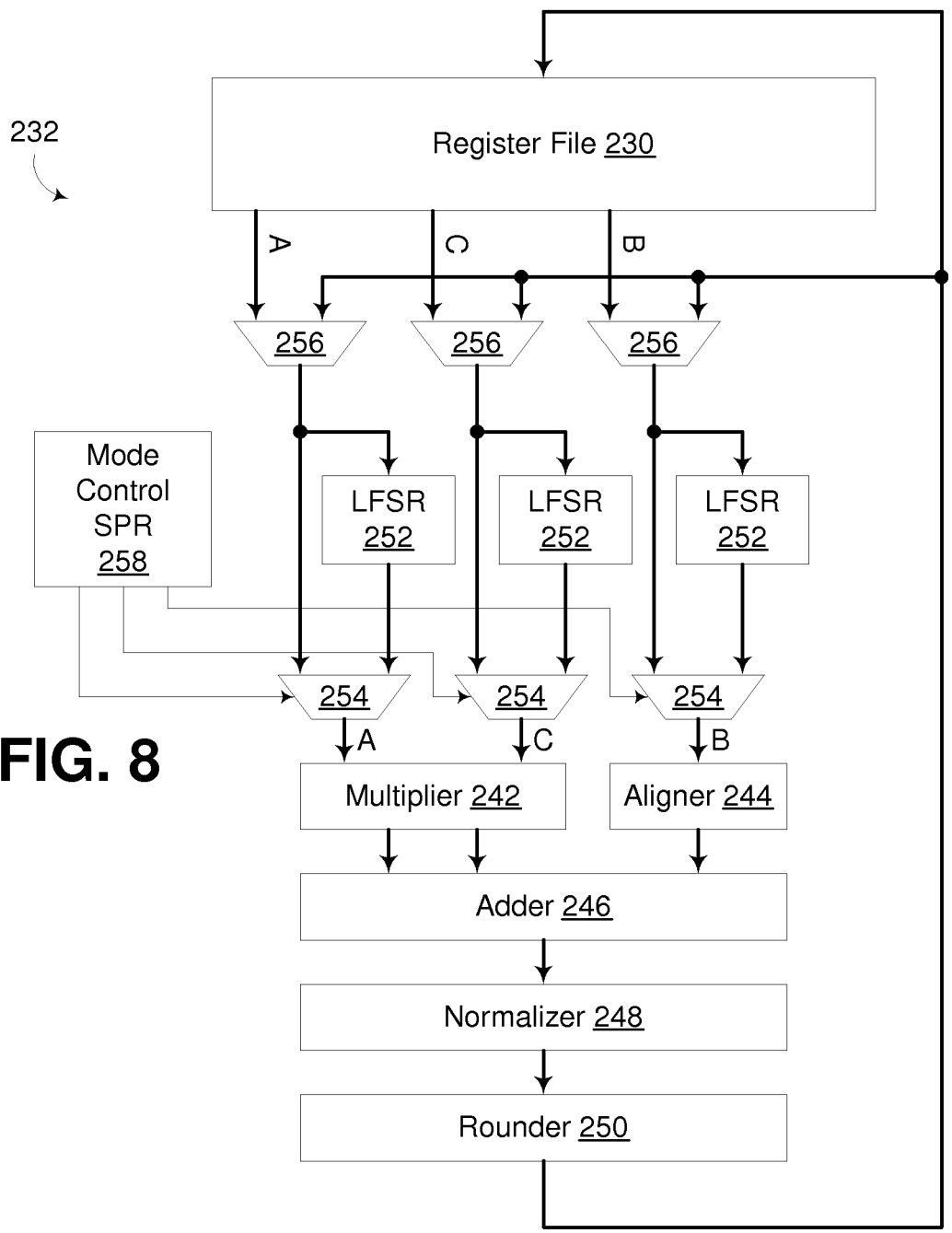
FIG. 8 is a block diagram of an exemplary implementation of one of the execution pipelines referenced in FIG. 7.

FIG. 8, for example, illustrates an exemplary implementation of an execution pipeline 232 that includes, in a first stage, a multiplier 242 for multiplying the A and C operands. Each execution pipeline 232 may also include an aligner 244 for aligning operand B with the product computed by multiplier 242, in parallel with the computation of the product. While alignment is shown in the same pipeline stage in FIG. 8, one skilled in the art will recognize that the multiplication and alignment may be performed in separate pipeline stages in other embodiments.

Each execution pipeline 232 may also include an adder 246 for adding two or more operands. In one embodiment (illustrated in FIG. 8), each adder 246 is configured to receive the product computed by multiplier 242 (output as a sum and carry), and add the product to the aligned operand output by aligner 244. Therefore, each execution pipeline 232 may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each execution pipeline 232 may also include a normalizer 248 and a rounder 250. Normalizer 248 may be configured to represent a computed value in a convenient exponential format. For example, normalizer 248 may receive the value 0.0000063 as a result of an operation. Normalizer 248 may convert the value into a more suitable exponential format, for example, 6.3×10-6. Rounder 250 is capable of rounding a computed value to a desired number of decimal points. For example, a computed value of 10.5682349 may be rounded to 10.568 if only three decimal places are desired in the result. In one embodiment of the invention, rounder 250 may round the least significant bits of the particular precision floating point number the rounder is designed to work with.

One skilled in the art will recognize that embodiments of the invention are not limited to the particular pipeline stages, components, and arrangement of components described above and in FIG. 8. For example, in some embodiments, aligner 244 may be configured to align operand B, a product computed by multiplier 242, or both. Furthermore, embodiments of the invention are not limited to the particular components described in FIG. 8. Any combination of the illustrated components and additional components such as, but not limited to, leading zero adders, dividers, etc. may be included in each execution pipeline 232 consistent with the invention.

It will also be appreciated that a number of different register file architectures may be used consistent with the invention. For example, register file 230 may be implemented with 128 quadword (128b) vector registers, or any different number and/or differently sized vector registers as appropriate.

In order to implement inlined pseudorandom number generation, execution pipeline 232 includes a set of pseudorandom number generators implemented as linear feedback shift registers (LFSR's) 252 coupled to control logic including a set of operand multiplexers 254, a set of bypass multiplexers 256 and a mode control special purpose register (SPR) 258.

Each operand input A, B and C for the execution pipeline includes a corresponding LFSR 252, operand multiplexer 254 and bypass multiplexer 256. For each LFSR 252, a given seed input into the LFSR results in the same pseudorandom number, with the seed input being the corresponding operand A, B or C output from register file 230. Of note, an LFSR 252 need not take as a seed input the entire portion of an operand, and in some embodiments only a subset of the bits representing an operand may be used to generate the seed value for an LFSR.

Each operand multiplexer 254 has one input coupled to receive the corresponding operand A, B or C, with the other input coupled to receive the pseudorandom number generated by the corresponding LFSR 252. A separate control line is output by mode control SPR 258 to control the mode of each operand multiplexer 254, and as such, mode control SPR 258 may be implemented with as few as 3 bits for each execution pipeline 232. Each execution pipeline 232 may include a separate SPR, or a single SPR may be used to control the operand multiplexers 254 for all execution pipelines 232 in execution unit 222 (FIG. 7). Each bypass multiplexer 256 is controlled in a conventional manner to route results from prior instructions to the operand inputs as desired. In some embodiments, bypass multiplexers may be omitted, such that results must be written back to the register file and read back out for subsequent instructions.

In the embodiment of FIG. 8, whenever it is desirable for software to use a pseudorandom number as an input for an arithmetic operation, a dedicated instruction (denoted herein as "mtopcntl") is used to write a control values into mode control SPR 258. The mode control SPR may also be readable by software as well, to facilitate context switching, debug-
ging, etc. The mtopcntl instruction in this embodiment takes a three bit immediate value for each execution pipeline, where the first bit is for the A operand, second for B, and third for C. A 0b value is used for normal operands (pass through register operands), while a 1b value denotes using the LFSR result instead of the operand. In addition, the mode control SPR, once set, maintains the same mode until it is set to another value or reset by another mtopcntl instruction. In other embodiments, an mtopcntl instruction may only apply the desired mode for the next instruction, or for a preset number of subsequent instructions (which may be set via an operand for the instruction), and then return to a default (000b) value.

So configured, functions such as Perlin noise functions or smoothing functions may be executed with substantial performance improvements compared to conventional designs. Table VI below, for example, illustrates exemplary pseudo assembly language code implementing a one dimensional smoothing function similar to that illustrated above in Table III, and suitable for execution by processing unit 220. For simplicity, and to provide a contrast with the pseudo assembly code illustrated above in Table V, only a one dimensional example is shown:

TABLE VI

One Dimensional Smoothing Function Assembly Code

| smoothnoise1: | | # input to function is in the fpr "fin" |
|---|---|---|
| fsub | fin_m1, fin, fone | # fin = fin − 1.0 |
| fadd | fin_p1, fin, fone | # fin = fin + 1.0 |
| mtopcntl | 0b100 | # use lfsr for A operand |
| fmul | frslt_tmp, fin, fhalf | # frslt_tmp = lfsr(fin) * 0.5 |
| fmadd | frslt_tmp, fin_m1, ffourth, frslt_tmp | # frslt_tmp += (lfsr(fin−1.0) * 0.25) |
| fmadd | frslt_tmp, fin_p1, ffourth, frslt_tmp | # frslt_tmp += (lfsr(fin+1.0) * 0.25) |
| | | # final result in frslt_tmp |
| mtopcntl | 0b000 | # reset operand controls |

The example above would require only approximately 5 dependent pipeline passes to implement the function, a large improvement over 50 that would otherwise be required by a conventional algorithm such as is illustrated above in Table V. Consequently, substantial performance gains can be realized for arithmetic operations that use pseudorandom numbers as operands thereto.

Various modifications may be made without departing from the spirit and scope of the invention. For example, additionally functionality, e.g., providing word reordering or swizzling, may also be used and controlled with mode control instructions such that operands may be reordered in conjunction with selectively overriding other operands with pseudorandom numbers. Other modifications will be apparent to one of ordinary skill in the art having the benefit of the present disclosure. Therefore, the invention lies in the claims hereinafter appended.

What is claimed is:

1. A circuit arrangement, comprising:
a pseudorandom number generator (PRNG) configured to generate a pseudorandom number;
an execution unit configured to execute instructions from an instruction set, wherein the execution unit is configured to execute a first instruction from the instruction set using a plurality of operands; and
control logic coupled to the execution unit and configured to supply the plurality of operands to the execution unit during execution of the first instruction, the control logic further configured to selectively output to the execution unit a pseudorandom number generated by the PRNG for use as a first operand among the plurality of operands during execution of the first instruction by the execution unit, wherein the execution unit is configured to execute the first instruction by performing an arithmetic operation using the pseudorandom number and a second operand identified by the first instruction.

2. The circuit arrangement of claim 1, wherein the control logic comprises an operand multiplexer configured to selectively override an operand provided by an operand source with the pseudorandom number.

3. The circuit arrangement of claim 2, wherein the control logic further comprises a bypass multiplexer coupled intermediate the operand multiplexer and the execution unit and configured to selectively override an output of the operand multiplexer with a result from a prior instruction executed by the execution unit.

4. The circuit arrangement of claim 2, wherein the control logic is further configured to communicate the operand provided by the operand source to the PRNG for use as an input value for the PRNG.

5. The circuit arrangement of claim 2, wherein the execution unit includes a plurality of operand inputs, and wherein each operand input is coupled to a separate PRNG and operand multiplexer.

6. The circuit arrangement of claim 2, wherein the execution unit includes a plurality of operand inputs, wherein each operand input is coupled to a separate operand multiplexer, and wherein each operand input is coupled to a common PRNG.

7. The circuit arrangement of claim 2, wherein the operand multiplexer is configured to operate in first and second modes, wherein in the first mode, the operand multiplexer is configured to output the operand provided by the operand source to an operand input for the execution unit, and wherein in the second mode, the operand multiplexer is configured to output the pseudorandom number to the operand input for the execution unit.

8. The circuit arrangement of claim 7, wherein the execution unit is configured to control the operand multiplexer to operate in one of the first and second modes in response to an operand identified in an instruction.

9. The circuit arrangement of claim 7, wherein the operand multiplexer is configured to operate in the first and second modes responsive to a software accessible special purpose register (SPR).

10. The circuit arrangement of claim 9, wherein the execution unit is configured to set the SPR in response to a mode control instruction.

11. The circuit arrangement of claim 9, wherein the execution unit is configured to control the operand multiplexer to operate in one of the first and second modes in response to an opcode identified in an instruction.

12. The circuit arrangement of claim 1, wherein the PRNG comprises a linear feedback shift register (LFSR).

13. The circuit arrangement of claim 1, wherein the execution unit is a pipelined execution unit, and wherein the execution unit is configured to execute the first instruction by performing the arithmetic operation using the pseudorandom number and the second operand identified by the first instruction such that the pseudorandom number is generated by the PRNG and used in the arithmetic operation during a single pass of the pipelined execution unit.

14. The circuit arrangement of claim 1, wherein the execution unit is selected from the group consisting of a floating point unit and a fixed point unit.

15. An integrated circuit device including the circuit arrangement of claim 1.

16. An article of manufacture comprising:
a non-transitory computer readable medium; and
logic definition program code stored on the computer readable medium and defining a circuit arrangement, wherein the circuit arrangement comprises:
a pseudorandom number generator (PRNG) configured to generate a pseudorandom number;
an execution unit configured to execute instructions from an instruction set, wherein the execution unit is configured to execute a first instruction from the instruction set using a plurality of operands; and
control logic coupled to the execution unit and configured to supply the plurality of operands to the execution unit during execution of the first instruction, the control logic further configured to selectively output to the execution unit a pseudorandom number generated by the PRNG for use as a first operand among the plurality of operands during execution of the first instruction by the execution unit, wherein the execution unit is configured to execute the first instruction by performing an arithmetic operation using the pseudorandom number and a second operand identified by the first instruction.

17. A method of executing an instruction using an execution unit of the type configured to execute instructions from an instruction set, the method comprising:
executing an instruction using the execution unit, wherein the instruction is of the type that uses a plurality of operands;
generating a pseudorandom number during execution of the instruction using a pseudorandom number generator (PRNG); and
supplying the plurality of operands to the execution unit during execution of the instruction, including selectively outputting to the execution unit the pseudorandom number generated by the PRNG for use as a first operand among the plurality of operands during execution of the instruction by the execution unit, wherein executing the instruction using the execution unit includes performing an arithmetic operation using the pseudorandom number and a second operand identified by the first instruction.

18. The method of claim 17, wherein selectively outputting the pseudorandom number includes controlling an operand multiplexer disposed between the PRNG and the execution unit to selectively override an operand provided by an operand source with the pseudorandom number.

19. The method of claim 18, further comprising communicating the operand provided by the operand source to the PRNG for use as an input value for the PRNG.

20. The method of claim 17, wherein the operand multiplexer is configured to operate in first and second modes, wherein in the first mode, the operand multiplexer is configured to output the operand provided by the operand source to an operand input for the execution unit, and wherein in the second mode, the operand multiplexer is configured to output the pseudorandom number of the operand input for the execution unit, wherein the operand multiplexer is configured to operate in the first and second modes responsive to a software accessible special purpose register (SPR), and wherein the execution unit is configured to set the SPR in response to a mode control instruction.

21. The method of claim 17, wherein the PRNG comprises a linear feedback shift register (LFSR).

22. The method of claim 17, wherein the execution unit is a pipelined execution unit, and executing the first instruction includes performing the arithmetic operation using the pseudorandom number and the second operand identified by the first instruction such that the pseudorandom number is generated by the PRNG and used in the arithmetic operation during a single pass of the pipelined execution unit.

23. The method of claim 17, wherein the execution unit is selected from the group consisting of a floating point unit and a fixed point unit.

* * * * *